(12) United States Patent
Wertz, II

(10) Patent No.: US 6,269,956 B1
(45) Date of Patent: *Aug. 7, 2001

(54) DISPOSABLE MEDIA FILTER

(75) Inventor: Glenn R. Wertz, II, Forest, VA (US)

(73) Assignee: Framatome Technologies, Inc., Lynchburg, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/065,824

(22) Filed: Apr. 23, 1998

(51) Int. Cl.[7] ............................. B01D 35/00; B01D 27/00
(52) U.S. Cl. ......................... 210/450; 210/457; 210/484; 210/497.01
(58) Field of Search .................................. 210/450, 451, 210/453, 455, 457, 458, 493.2, 497.01, 232, 470, 459–462, 484, 485; 277/918

(56) References Cited

U.S. PATENT DOCUMENTS

| | | |
|---|---|---|
| 3,011,644 | 12/1961 | Farrell et al. . |
| 3,327,858 | 6/1967 | Eddy et al. . |
| 3,648,842 | 3/1972 | Zievers . |
| 3,890,233 | 6/1975 | Gischel . |
| 4,023,944 | 5/1977 | Beane . |
| 4,024,065 | 5/1977 | Morgan, Jr. . |
| 4,202,555 | * 5/1980 | Becker et al. .................. 277/576 |
| 4,427,547 | 1/1984 | Millet et al. . |
| 4,495,072 | 1/1985 | Fields . |
| 4,517,088 | 5/1985 | Miller . |
| 4,572,710 | 2/1986 | Stock et al. . |
| 4,756,876 | 7/1988 | Daggard et al. . |
| 4,818,398 | 4/1989 | Lott et al. . |
| 4,883,588 | 11/1989 | Primavera et al. . |
| 5,015,375 | 5/1991 | Fleck . |
| 5,017,330 | 5/1991 | Hurdiel . |
| 5,200,067 | 4/1993 | Sann . |
| 5,236,595 | 8/1993 | Wang et al. . |
| 5,250,179 | * 10/1993 | Spearman .................. 210/315 |
| 5,379,330 | 1/1995 | Lovell et al. . |
| 5,478,469 | 12/1995 | Bryan et al. . |
| 5,593,578 | 1/1997 | Bryan et al. . |
| 5,678,230 | 10/1997 | Bryan et al. . |

* cited by examiner

*Primary Examiner*—Ana Fortuna
*Assistant Examiner*—Richard W. Ward
(74) *Attorney, Agent, or Firm*—Rhodes & Mason, PLLC

(57) ABSTRACT

A filter for a filter vessel which converts the filter vessel to use disposable filters for removing hazardous particulate matter from an aqueous flow. The filter includes a rigid support housing having an input passage for the aqueous flow, an exit passage for the aqueous flow, an internal sealing surface and a locking seal located adjacent to the input passage to securely engage the filter vessel for the aqueous flow. The invention also includes a sleeveless disposable filter cartridge. The cartridge includes a flexible filtering medium having first and second ends. A terminal seal is affixed to the first end of the filtering medium for sealing engagement with the filter vessel and a wall seal on the second end of the filtering medium for engagement with the internal sealing surface of the support housing.

41 Claims, 3 Drawing Sheets

DISPOSABLE MEDIA FILTER

BACKGROUND OF THE INVENTION

(1) Field of the Invention

The present invention relates generally to filters and, more particularly, to a disposable filter for removing particulate matter from an aqueous flow, especially radioactive materials entrained in cooling water, which provides an improved cartridge-style filter for use in such installations to reduce the volume and weight of the hazardous waste resulting from the end of life of the filter.

(2) Description of the Prior Art

Nuclear reactors use water in primary and secondary support systems. Some of the particulate entrained in these systems are radioactive. These radioactive particles must be removed for safe and efficient system operational and maintenance. This is done conventionally by filter elements that are installed for a given period of time to remove the particulates. After a period of time, the filter becomes clogged with removed particulate and must be replaced.

Conventional filters for this purpose have a perforated, stainless steel outer cylinder and, in some cases, an inner stainless steel cylinder, and stainless steel end fittings, and a permanently installed interior filter medium. The filtrate flows from inside to outside through the filter medium and the pores of the stainless steel cylinder. The outer stainless steel cylinder and end fittings have been considered a necessity to give the filter the structural strength and integrity to withstand the temperature, pressure and dynamic filtration loads of the forces of the flowing liquid and avoid corrosion.

However, when the filter is spent, the outer and inner cylinders and end fittings become a large, strong, corrosion resistant, heavy piece of hazardous, radioactive waste. Requirements for disposal of this type of waste safely are very costly. The steel is difficult to compress to a reduced volume and does not easily shred to smaller pieces. Disposal of the filter, therefore, requires a great deal of cost.

One solution to this problem is disclosed in U.S. Pat. Nos. 5,478,469 and 5,678,230, issued to Bryan and Pop. These patents disclose a disposable filter for removing hazardous particulate matter from an aqueous flow. The filter includes a rigid support housing having an input port for the aqueous flow, an exit port for the aqueous flow, a brace to securingly engage a filter vessel for the aqueous flow, an internal seal and an external seal, and a disposable filter cartridge configured similarly to the housing and sized to be substantially entirely received within the housing and sealingly engage the internal seal and having a filter medium that extends across a path from the input port to the exit port when received in the housing, the cartridge having a terminal seal located to sealingly engage the cartridge to the aqueous flow filter vessel outside of the housing when the cartridge sealing engages with the internal seal. The rigid support housing may be installed in a filter vessel for an extended period and held in place by the brace, and repeatedly during the extended period, a disposable cartridge may be installed within the housing to seal the cartridge to the filter vessel, aqueous flow may be directed through the filter medium, and the cartridge may be removed and discarded. These patents are hereby incorporated by reference in their entirety.

For all of its advantages, the Bryan and Pop filter did have some drawbacks. Specifically, the brace arrangement was difficult to machine and install in the field. Furthermore, the disposable filter included some hard to dispose of metal parts. Finally, the porous outer sleeve used to add strength to the disposable filter took up critical space that limited the applications which could benefit from the filter.

Thus, there remains a need for a new and improved disposable filter which performs well in existing facilities, reduces the cost of disposal of spent filters contaminated with hazardous materials such as radioactive particulate matter while, at the same time, overcomes the problems associated with Bryan and Pop.

SUMMARY OF THE INVENTION

The present invention is directed to a filter for a filter vessel which converts the filter vessel to use disposable filters. The filter includes a rigid support housing having an input passage for the aqueous flow, an exit passage for the aqueous flow, an internal sealing surface and a locking seal located adjacent to the input passage to securingly engage the housing to the filter vessel for the aqueous flow.

The invention also includes a disposable filter cartridge. The cartridge includes a flexible filtering medium having first and second ends. A terminal seal is affixed to the first end of the filtering medium for sealing engagement with the filter vessel and filter vessel lid and a wall seal on the second end of the filtering medium for engagement with the internal sealing surface of the support housing. The filtering medium is sized to be substantially entirely received within the support housing and to sealingly engage the internal sealing surface in the support housing with the wall seal and the filter medium extends across a path from the input passages to the exit passages of the support housing when the terminal seal engages with the filter vessel and filter vessel lid.

In the preferred embodiment, a lifting point is formed in the disposable filter cartridge adjacent to the terminal seal to permit easy removal of the cartridge either by hand or tooling.

The support housing may be installed in a filter vessel for an extended period and held in place by the locking seal, and repeatedly during the extended period, the disposable filter cartridge may be installed within the support housing to seal the disposable filter cartridge to the filter vessel and the support housing, to direct aqueous flow through the filter medium, and the disposable filter cartridge may be removed and discarded.

In a preferred embodiment the housing has a cylindrical shape including two ends and inner and outer sidewalls, with an input port at one end of the cylindrical shape and a plurality of exit ports in the form of apertures in the outer sidewall. In the preferred embodiment the cartridge has a cylindrical shape including two ends and a sidewall, the terminal seal being located at one end, the sidewall extending across the path between inlet port and outlet ports of the housing, and the wall seal engaging the internal sealing surface of the housing.

Typically, the housing is made of stainless steel. In a preferred embodiment the cartridge includes ends containing seals and a flexible filtering medium. The flexible filtering medium may be of any suitable filtering medium such as polysulfone foam or polypropylene. The seals may be silicone rubber.

Accordingly, one aspect of the present invention is to provide a filter for removing particulate matter from an aqueous flow. The filter includes: (a) a rigid support housing having an input passage for the aqueous flow, an exit passage for the aqueous flow, an internal sealing surface and a locking seal located adjacent to the input passage to securingly engage the housing to a filter vessel for the aqueous flow; and (b) a disposable filter cartridge sized to be substantially entirely received within the housing and having a filter medium that extends across a path from the input passage to the exit passage when received in the housing, the cartridge having a terminal seal located to sealingly engage the cartridge to the filter vessel for aqueous flow outside of the filter vessel and the housing when the cartridge sealingly engages with the internal sealing surface of the housing, whereby the support housing may be installed in a filter vessel for an extended period and held in place by the locking seal, and repeatedly used during the extended period, the disposable filter cartridge may be installed within the support housing to seal the disposable filter cartridge to the filter vessel and the support housing, aqueous flow may be directed through the filter medium, and the disposable filter cartridge may be removed and discarded.

Another aspect of the present invention is to provide a disposable filter cartridge for removing particulate matter from an aqueous flow and for installation inside a support housing that is installed within an aqueous flow filter vessel and that has an input port at one end and exit ports in a housing sidewall. The disposable filter cartridge includes: (a) a flexible filtering medium having first and second ends; (b) a terminal seal affixed to the first end of the filtering medium for sealing engagement with the filter vessel; and (c) a wall seal on the second end of the filtering medium, the filtering medium sized to be substantially entirely received within the support housing and to sealingly engage the internal sealing surface in the support housing with the wall seal and the filter medium extends across a path from the input passage to the exit passages of the support housing when the terminal seal sealingly engages with the filter vessel, whereby the disposable filter cartridge may be installed within the support housing to seal the disposable filter cartridge to the filter vessel, aqueous flow may be directed through the filter medium, and the disposable filter cartridge may be subsequently removed and discarded.

Still another aspect of the present invention is to provide a filter for removing particulate matter from an aqueous flow. The filter includes: (a) a rigid support housing having an input passage for the aqueous flow, an exit passage for the aqueous flow, an internal sealing surface and a locking seal located adjacent to the input passage to securingly engage the housing to a filter vessel for the aqueous flow; (b) a disposable filter cartridge, the cartridge including: (i) a flexible filtering medium having first and second ends; (ii) a terminal seal affixed to the first end of the filtering medium for sealing engagement with the filter vessel; and (iii) a wall seal on the second end of the filtering medium, the filtering medium sized to be substantially entirely received within the support housing and to sealingly engage the internal sealing surface in the support housing with the wall seal and the filter medium extends across a path from the input passage to the exit passages of the support housing when the terminal seal sealingly engages with the filter vessel; and (c) a lifting point formed in the disposable filter cartridge adjacent to the terminal seal, whereby the support housing may be installed in a filter vessel for an extended period and held in place by the locking seal, and repeatedly used during the extended period, the disposable filter cartridge may be installed within the support housing to seal the disposable filter cartridge to the filter vessel and the support housing, aqueous flow may be directed through the filter medium, and the disposable filter cartridge may be removed and discarded.

These and other aspects of the present invention will become apparent to those skilled in the art after a reading of the following description of the preferred embodiment when considered with the drawings.

DESCRIPTION OF THE PREFERRED EMBODIMENTS

Figure 1:
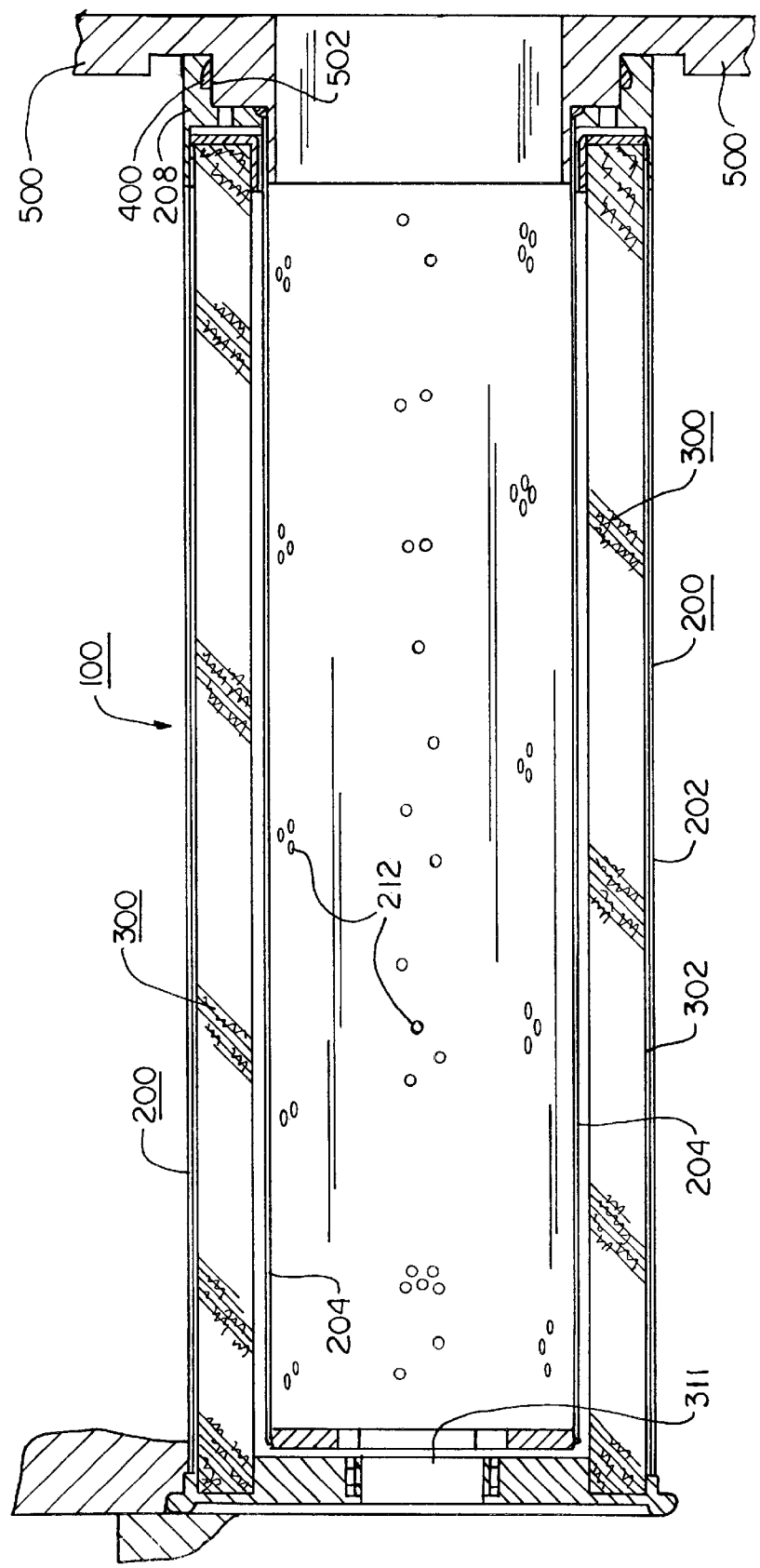
FIG. 1 is cross-sectional view of a filter vessel holding the nested support housing and disposable filter cartridge constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Figure 2:
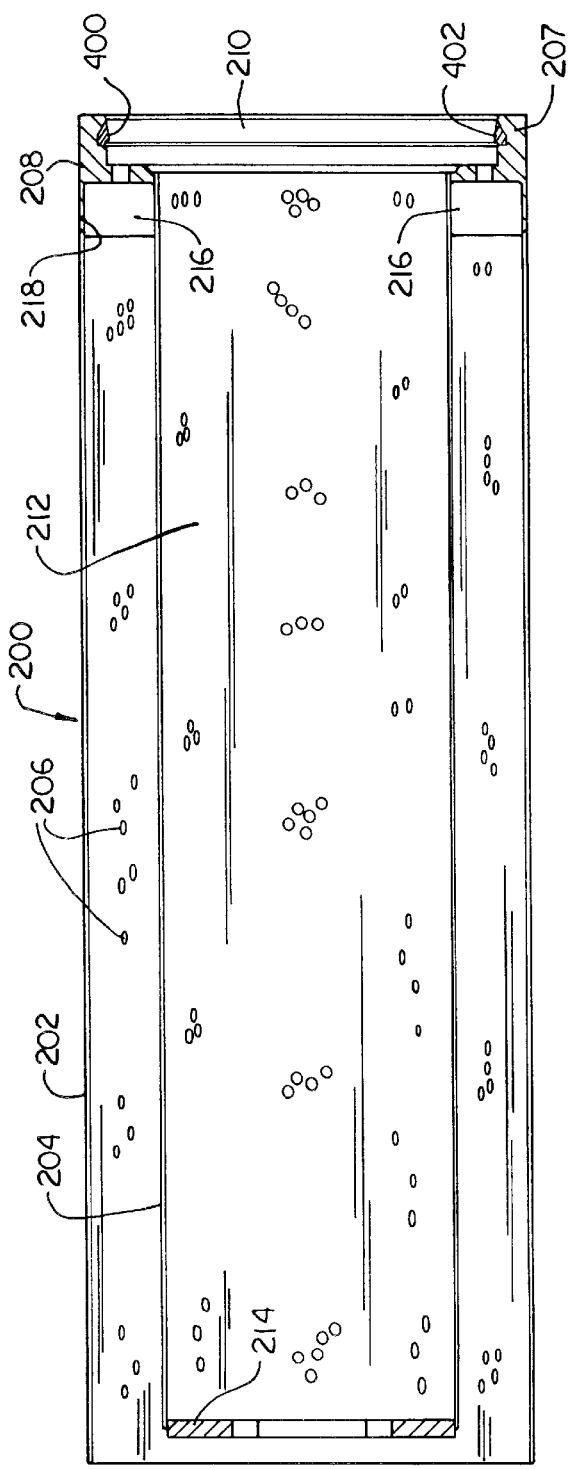
FIG. 2 is a cross sectional view of the support housing of the present invention.
Figure 3:
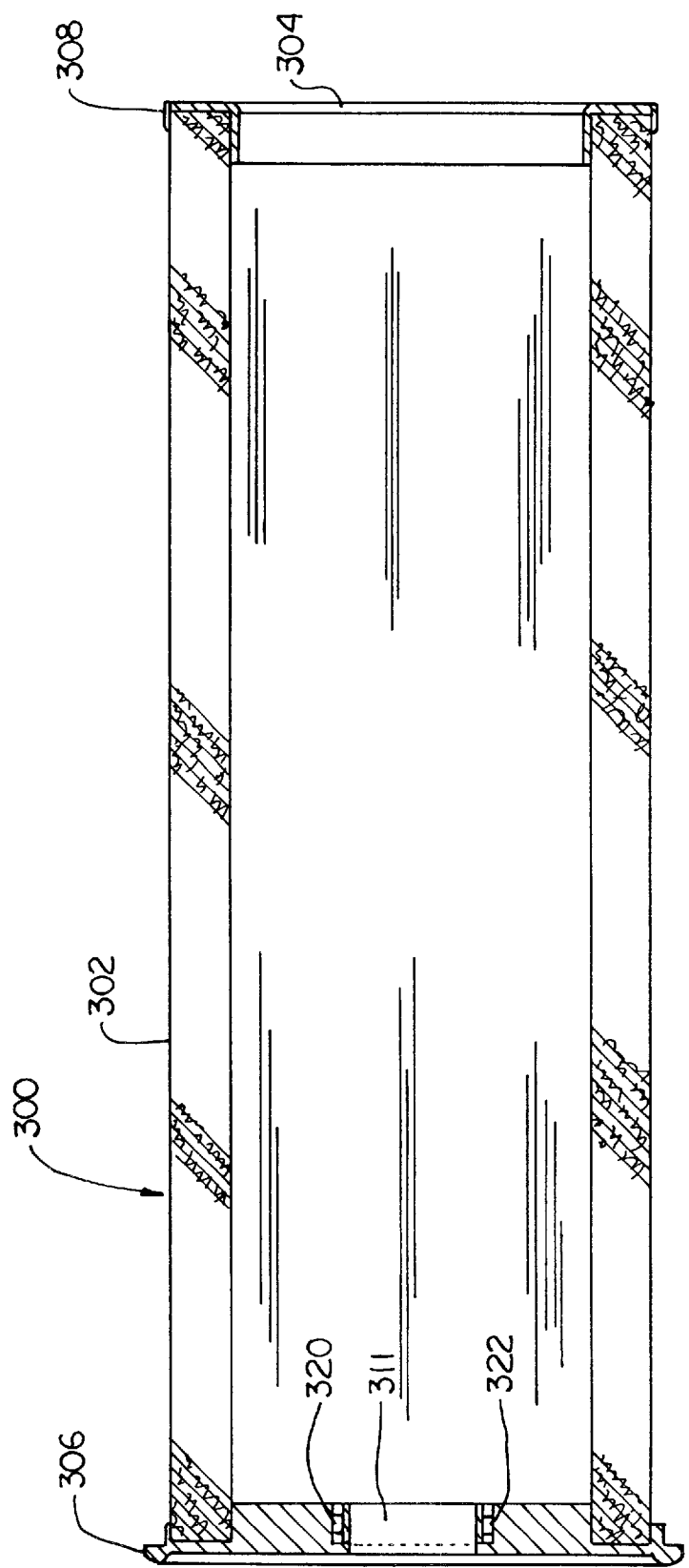
FIG. 3 is a cross sectional view of the disposable filter cartridge of the present invention.

Referring now to the drawings in general and FIG. 1 in particular, it will be understood that the illustrations are for the purpose of describing a preferred embodiment of the invention and are not intended to limit the invention thereto. As best seen in FIGS. 1–3, the present invention, indicated generally at 100, includes a support housing 200 and a disposable filter cartridge 300. Disposable filter cartridge 300 is nested in support housing 200 which in turn is inserted in a high-strength, stainless steel filter vessel 500. Disposable filter cartridge 300 includes terminal seal 306, wall seal 308 and flexible media 302 interposed therebetween. Terminal seal provides a sealing engagement with filter vessel 500 (shown in partial sectional view).

Preferably, flexible media 302 is comprised of polypropylene or polysulfone. The practice of the present invention includes using other suitable filter media materials as a particular situation may dictate. The structural integrity and filtering ability of flexible media may be enhanced by introducing pleats or corrugations therein. In a preferred embodiment, flexible media 302 filters particles in the range of between about 0.2 and about 100 microns.

Each of the seals 306,308 may be constructed from a elastomeric material such as a silicone rubber. A desirable material is that designated RTV 664 available from General Electric. Seal 308 has an outer sealing surface sized to create a compressive fit against the internal sealing surface 218 located in the annular seal cavity 216 of adaptor housing 200. Seal cavity 216 is formed in solid base plate 208. The term solid as used herein refers to the lack of any flow openings in the side walls of base plate 208.

Disposable filter 300 may also include a lifting aperture 311 to facilitate removal from support housing 200. In a preferred embodiment, lifting aperture 311 may be shaped or adapted to receive a variety of tools for removing disposable filter 300 from adaptor housing 200. Preferably, lifting aperture 311 is round or generally cylindrical. For economy of construction lifting aperture 311 and terminal seal 306 may be formed as an integral unit from silicone rubber.

Reinforcing member 320 may be included as shown in FIG. 3 to add strength to lifting aperture 311. Desirably, this element is constructed of a non-metallic material to enhance the ease of volume reduction and increase the number of potential disposal methodologies of spent filter 300. Suitable materials include polymers such as polyethylene, polypropylene, nylon, cellulosic materials and the like. Ceramics could be used but are not preferred because they may present disposal difficulties.

Because some materials may not bond well to silicone rubber, a plurality of anchors may be provided in reinforcing member. In the preferred embodiment shown in FIG. 3, the anchors comprise a series of holes 322 positioned in the circular reinforcing member 320. It will be readily understood that the silicone rubber will flow into and fill holes 322 during formation of lifting aperture 311. Other types of anchors may be used as well. For instance, a series of laterally expending projections could be provided around the circumference of reinforcing member 320.

As seen in FIG. 1, the bottom of filter cartridge does not seat on the floor of annular seal cavity. Also the inside diameter of wall seal 308 does not touch inner shroud 204. Thus, high pressure fluid entering filter vessel 500 will fill the space under filter cartridge 300 and be stopped at sealing surface 218, as best seen in FIG. 2.

As seen in FIG. 2, support housing 200 includes outer shroud 202, input passage 210, annular seal cavity 216 having an internal sealing surface 218, base 208 and locking seal 400. Housing 200 also includes an output passage which in this preferred embodiment is a porous member comprised of a plurality of holes 206. Outer shroud 202 and base 208 are constructed of metal, preferably stainless steel for its resistance to corrosion.

Support housing 200 may further include an inner shroud 204 whose function is to protect flexible media 302 from back pressure situations. Back pressure may be created unintentionally if a drain valve is left open and then an outlet valve downstream of filter assembly is opened. Static system pressure may force a backflow through the combined housing 200 and filter 300 unit. Inner shroud 204 protects flexible media 302 from damage in such a situation. There need not be any direct contact between these two elements in order for inner shroud 204 to perform its protective function. In the preferred embodiment, inner shroud 204 is concentric with outer shroud 202 and is also constructed of stainless steel. A lifting point 214 may be provided to facilitate installation and removal of the adaptor housing into or from the filter vessel. As is the case with outer shroud 202, inner shroud 204 is porous and may include a plurality of holes 212 for fluid flow.

Locking seal 400 performs two functions. First, it holds adaptor housing in place so that a spent disposable filter 300 may be removed. Second, it creates a seal against the high-pressure fluid entering though input passage 210 and bypassing wall seal 308. Locking seal 400 is positioned in a seal recess 207 in base plate 208. Seal 400 is wedge-shaped in cross section with the point of the shape directed towards the bottom of the adaptor housing 200.

Figure 2A:
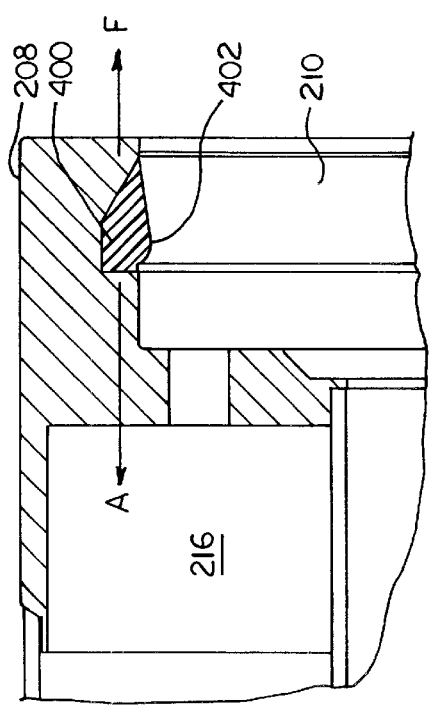
FIG. 2A is a partial expanded view of the structure and operation of the support housing seal.

The embodiment depicted in FIG. 2 is referred to as an inside diameter embodiment because locking seal 400 is positioned in the inside diameter of base plate 208. Locking seal includes protuberance 402 which extends into input passage 210 by a small amount. As support housing 200 is inserted into filter vessel 500 and firmly seated therein, protuberance 402 is radially compressed against the inlet port 502 of filter vessel 500. Any attempt to remove support housing by pulling upward in the direction of arrow "A" is resisted by the interference fit between inlet port 502 and locking seal 400. The friction force, illustrated by arrow "F" in FIG. 2A, can be substantial with the proper selection of the compressive forces generated in locking seal 400. In a preferred embodiment, silicone rubber is used to take advantage of its suitable characteristics for creating the desired interference fit.

It has been found that in addition to the friction force caused by the interference fit between the inlet port 502 and locking seal 400 which acts parallel to the central axis of support housing 200, an additional compressive force acting at an angle to the housing centerline creates an additional friction force as the locking seal 400 is drawn upwardly towards the upper surface of seal recess 207. It has been found that the friction forces are so great as to require the use of a mechanical puller to remove the support housing from the filter vessel. The advantage of this arrangement is that filter cartridge 300 may be removed from support housing 200 without unintentionally removing support housing 200 from filter vessel.

In an alternative embodiment, referred to as the outside diameter embodiment, locking seal 400 may be located in a recess formed around the outside circumference of base plate 208. The protuberance in this embodiment engages the inside surface of filter vessel to create the compressive fit described above.

The structure of the support housing 200 and filter cartridge 300 provide several advantages over prior art designs. First, no separate mechanism is required to hold the support housing firmly in the filter vessel as filter cartridge 300 is removed therefrom. Locking seal 400 performs a dual function of creating a hydraulic seal against the high pressure fluid and locking the support housing 200 in place with only one easy to manufacture part.

Second, the axial loading on flexible media 302 when filter vessel 500 is pressurized is reduced by moving the wall seal on the second end from the inside diameter to the outside diameter. Thus a structural reinforcing member for filter cartridge 300 is not required.

The combination of locking seal structures of the present invention eliminates the exposed wall seals used in prior art designs. Such an exposed seal is susceptible to deformation and damage during routine handling.

Yet another advantage of the present invention is that support housing installation/removal and filter cartridge replacement may be accomplished using simple tools. These features are important as these activities are sometimes done remotely given the high radioactive contamination levels present in the components of the filter vessel 500.

Certain modifications and improvements will occur to those skilled in the art upon a reading of the foregoing description. By way of example, in an alternative embodiment, one end of the filter cartridge 300 may be closed and not provided with a terminal seal 306,308. This embodiment would be used for filter vessels 500 not requiring seals at both ends of the filter cartridge. Also, each of the terminal seals 306,308 may include embedded structural members and provide different types of sealing surfaces to accommodate aqueous flow from the outside to the inside of the filter.

It should be understood that all such modifications and improvements have been deleted herein for the sake of conciseness and readability but are properly within the scope of the following claims.

I claim:

1. A filter for use with a filter vessel for removing particulate matter from an aqueous flow, said filter comprising:

(a) a rigid support housing comprising: a base plate for surrounding a filter vessel input passage for the aqueous flow; a groove on an inside surface of said base plate having a locking seal for securingly engaging said filter vessel input passage; a sidewall including an exit passage for the aqueous flow; and, an annular seal cavity having an internal sealing surface for receiving a sleeveless disposable filter cartridge; and, (b) a sleeveless disposable filter cartridge sized to be substantially entirely received within said housing, said cartridge having a filter medium that extends across a path from said input passage to said exit passage when received in said housing, said cartridge having a terminal seal affixed to one end of said filtering medium for sealing engagement with said filter vessel, said cartridge also having an annular wall seal located on a second end of said filtering medium, said annular wall seal having an outer sealing surface sized to create a compression fit against said internal sealing surface when said cartridge sealingly engages with said internal sealing surface of said housing;

wherein, said support housing may be installed in said filter vessel for an extended period and held in place by said locking seal, and repeatedly during said extended period, said cartridge may be installed within said support housing to seal said cartridge to said filter vessel and said housing, aqueous flow may be directed through said filter medium, and said cartridge may be removed and discarded.

2. The filter according to claim 1, further including a lifting point formed in said disposable filter cartridge adjacent to said terminal seal.

3. The filter according to claim 2, wherein said lifting point includes a non-metallic cap including at least one aperture extending through its surface.

4. The filter according to claim 3, wherein said aperture is adapted to receive a handling tool.

5. The filter according to claim 4, wherein said aperture is a cylindrical opening.

6. The filter according to claim 3, wherein said lifting point includes a reinforcing member embedded in said cap adjacent to at least one of said aperture.

7. The filter according to claim 6, wherein said reinforcing member is formed from a non-metallic material.

8. The filter according to claim 7, wherein said reinforcing member includes a plurality of anchoring points to attach said reinforcing member within said cap.

9. The filter according to claim 1, wherein said housing has a cylindrical shape including two ends and a sidewall, with an input passage at one end of the cylindrical shape and a plurality of exit passages in the form of apertures in said sidewall.

10. The filter according to claim 9, wherein said housing is made of stainless steel.

11. The filter according to claim 1, wherein said locking seal is wedge shaped.

12. The filter according to claim 11, wherein said locking seal is formed from silicone rubber.

13. The filter according to claim 1, further including an inner shroud to protect said filter medium from damage due to back pressure.

14. The filter according to claim 13, wherein said inner shroud has a cylindrical shape including two ends and a sidewall, with an inner shroud input passage at one end of the cylindrical shape and a plurality of inner shroud exit passages in the form of apertures in said sidewall.

15. The filter according to claim 14, wherein said inner shroud is made of stainless steel.

16. The filter according to claim 13, wherein said inner shroud includes a lifting point formed in one end of said inner shroud.

17. The filter according to claim 16, wherein said lifting point includes at least one aperture extending through its surface.

18. The filter according to claim 17, wherein said aperture is adapted to receive a handling tool.

19. The filter according to claim 18, wherein said aperture is a cylindrical opening.

20. A filter for use with a filter vessel for removing particulate matter from an aqueous flow, said filter comprising:
(a) a rigid support housing comprising: a base plate for surrounding an filter vessel input passage for the aqueous flow; a groove on an inside surface of said base plate having a locking seal for securingly engaging said filter vessel input passage; a sidewall including an exit passage for the aqueous flow; and, an annular seal cavity having an internal sealing surface for receiving a sleeveless disposable filter cartridge; and
(b) a sleeveless disposable filter cartridge, said cartridge including: (i) a flexible filtering medium having first and second ends; (ii) a terminal seal affixed to said first end of said filtering medium for sealing engagement with said filter vessel; and, (iii) an annular wall seal having an outer sealing surface on said second end of said filtering medium, said filtering medium sized to be substantially entirely received within said support housing and to sealingly engage said internal sealing surface in said support housing with said wall seal outer sealing surface and said filter medium extends across a path from the input passage to the exit passage of said support housing when said terminal seal engages with said filter vessel; and
(c) a lifting point formed in said cartridge adjacent to said terminal seal;
wherein, said support housing may be installed in said filter vessel for an extended period and held in place by said locking seal, and repeatedly during said extended period, said cartridge may be installed within said support housing to seal said cartridge to said filter vessel and said housing, aqueous flow may be directed through said filter medium, and said cartridge may be removed and discarded.

21. The filter according to claim 20, wherein said lifting point is a non-metallic cap including at least one aperture extending through its surface.

22. The filter according to claim 21, wherein said aperture is adapted to receive a handling tool.

23. The filter according to claim 22, wherein said aperture is a cylindrical opening.

24. The filter according to claim 21, wherein said lifting point includes a reinforcing member embedded in said cap adjacent to at least one of said aperture.

25. The filter according to claim 24, wherein said reinforcing member is formed from a non-metallic material.

26. The filter according to claim 25, wherein said reinforcing member includes a plurality of anchoring points to attach said reinforcing member within said cap.

27. The filter according to claim 20, wherein said housing has a cylindrical shape including two ends and a sidewall, with an input passage at one end of the cylindrical shape and a plurality of exit passages in the form of apertures in said sidewall.

28. The filter according to claim 27, wherein said housing is made of stainless steel.

29. The filter according to claim 20, wherein said locking seal is wedge shaped.

30. The filter according to claim 29, wherein said locking seal is formed from silicone rubber.

31. The filter according to claim 20, further including an inner shroud to protect said filter medium from damage due to back pressure.

32. The filter according to claim 31, wherein said inner shroud has a cylindrical shape including two ends and a sidewall, with an inner shroud input passage at one end of the cylindrical shape and a plurality of inner shroud exit passages in the form of apertures in said sidewall.

33. The filter according to claim 32, wherein said inner shroud is made of stainless steel.

34. The filter according to claim 31, wherein said inner shroud includes a lifting point formed in one end of said inner shroud.

35. The filter according to claim 34, wherein said lifting point includes at least one aperture extending through its surface.

36. The filter according to claim 35, wherein said aperture is adapted to receive a handling tool.

37. The filter according to claim 36, wherein said aperture is a cylindrical opening.

38. The filter according to claim 20, wherein said flexible filtering medium is selected from the group consisting of polysulfone and polypropylene.

39. The filter according to claim 20, wherein, said filtering medium filters particles between about 0.2 and 100 microns.

40. The filter according to claim 20, wherein said terminal seal and said wall seal are formed from silicone rubber.

41. The filter according to claim 20, wherein said cartridge has a cylindrical shape including two ends and a sidewall, said terminal seal being located at one end, said sidewall extending across said path, and said wall seal engaging said internal sealing surface of said support housing.

* * * * *